United States Patent [19]
Slocumb

[11] Patent Number: 5,753,337
[45] Date of Patent: May 19, 1998

[54] PLASTIC NET STRUCTURES AND THE PLASTIC NET STRUCTURES FORMED THEREBY

[75] Inventor: Robert C. Slocumb, Plymouth, Minn.

[73] Assignee: The Tensar Corporation, Morrow, Ga.

[21] Appl. No.: 348,685

[22] Filed: Dec. 2, 1994

[51] Int. Cl.$^6$ ................................................. B32B 5/12
[52] U.S. Cl. ................ 428/107; 405/302.3; 428/114; 428/219; 428/910
[58] Field of Search ................ 87/13; 405/302.3, 405/258, 272, 284; 428/107, 114, 910, 219

[56] References Cited

U.S. PATENT DOCUMENTS

| | | |
|---|---|---|
| 3,015,854 | 1/1962 | McClure . |
| 3,085,292 | 4/1963 | Kindseth . |
| 3,394,431 | 7/1968 | Nalle, Jr. . |
| 3,477,892 | 11/1969 | Plymale . |
| 3,505,157 | 4/1970 | Fields et al. . |
| 3,515,778 | 6/1970 | Gills et al. . |
| 3,700,521 | 10/1972 | Gaffney ........................ 156/167 |
| 4,020,208 | 4/1977 | Mercer et al. .................... 428/255 |
| 4,336,638 | 6/1982 | Mercer ........................... 264/290.2 |
| 4,374,798 | 2/1983 | Mercer . |
| 4,631,161 | 12/1986 | Popow . |
| 4,662,946 | 5/1987 | Mercer ........................... 106/281 R |
| 4,749,306 | 6/1988 | Demeny et al. ................. 405/45 |
| 4,815,892 | 3/1989 | Martin ............................. 405/45 |
| 5,092,468 | 3/1992 | Slocumb ......................... 206/597 |
| 5,207,962 | 5/1993 | Hovis et al. . |

Primary Examiner—James J. Bell
Attorney, Agent, or Firm—Jacobson, Price, Holman & Stern, PLLC

[57] ABSTRACT

A method of making a biplanar net structure usable to provide reinforcement in civil engineering and/or landfill applications by extruding first and second linear arrays of plastic filaments into first and second sets of spaced-apart grooves provided in a filament receiving member. The grooves of the respective sets cross each other, and the plastic filaments bond to each other at the crossing points to provide a biplanar net structure. The net structure then is uniaxially or biaxially stretched. The apparatus employed to carry out the method and the oriented biplanar net structures also form a part of this invention.

10 Claims, 3 Drawing Sheets

PLASTIC NET STRUCTURES AND THE PLASTIC NET STRUCTURES FORMED THEREBY

BACKGROUND OF THE INVENTION

This invention relates generally to methods and apparatus for forming plastic net structures and the plastic net structures formed thereby, and more specifically to the formation of plastic net structures which are well suited for use as reinforcing grids in civil engineering and landfill applications.

BACKGROUND OF PRIOR ART

The use of plastic net structures as reinforcing grids to replace the use of steel rods and similar structures in reinforcing and/or stabilizing concrete and soil in civil engineering and landfill applications has become quite popular. These plastic net structures generally are either uniaxially or biaxially oriented to provide a highly stable, corrosion resistant construction which is used in a wide variety of applications, i.e., for soil stabilization, for veneer stabilization, as drainage nets in landfills, for concrete stabilization in roads, bridges and similar structures, etc.

Prior art plastic net structures used for civil engineering and landfill applications have been formed from a variety of plastic materials, and in particular, high density polyethylene, polypropylene, high density polyester filaments and glass fibers.

Uniaxially stretched high density polyethylene net structures have found wide application as drainage nets for landfills. These products, which often are formed from flat machine-direction and cross-machine-direction filaments, generally are stretched in only one direction, because strength in only a single direction is required for this application. One of the leading producers of polyethylene plastic netting for use as drainage nets and for use in other civil engineering applications, is the Tensar Corporation, located in Morrow, Ga.

Biaxially oriented polypropylene nets and uniaxially oriented, high density polyethylene nets have found wide application in civil engineering applications, such as in the stabilization of road beds, levies and similar structures, where poor soil conditions exist. In fact, biaxially oriented polypropylene netting has been effectively utilized to reinforce road beds on surfaces that are as much as 50% water. Other conventional materials such as concrete and steel tend to sink in these latter water-saturated surfaces, unless the soil is preconditioned before forming the road bed, such as by utilizing footings, or by draining the soil. In these latter road bed applications the use of plastic reinforcing nets can provide as much as a 10 to 1 savings in cost, as compared to the use of conventional concrete and steel reinforcing systems.

As stated above, other plastic reinforcing nets have been made of high density polyester fiber strands and also of glass filaments. A typical plastic net structure formed of polyester strands is sold by Mirafi, located in Charlotte, N.C., under the brand name Miragrid 10T. A typical prior art net formed of glass fibers is sold by Bay Mills Ltd. under the brand name Glasgrid.

Plastic net structures made from glass filaments tend to be more brittle than those made from the earlier mentioned plastic materials. This limits the use of such glass filament nets to environments where brittleness will not have an adverse effect on product performance. In particular, nettings made of glass fibers have found some limited applications in reinforcing asphalt structures.

In applications wherein the reduction or elimination of creep is extremely important, such as in the stabilization of roads and soil, the reinforcing material should have minimal creep, i.e., it should not tend to stretch excessively under load. From an economic standpoint, it is most desirable to utilize a material having a high creep reduction factor, since the higher the creep reduction factor, the less material that is required to form the plastic netting.

It is known that polyesters have a higher creep reduction factor (e.g., a higher modulus) than the polyolefins, and therefore, at least based on this singular property, polyester would appear to be a more desirable plastic material to utilize in the fabrication of reinforcing nets than the polyolefins. However, polyester, as well as glass, tends to undergo hydrolysis when used in wet environments, which typically is the environment in which reinforcing and/or drainage nets are employed. Hydrolysis causes these materials to break down, in a manner analogous to the corrosion of conventional metal reinforcing rods.

To overcome the hydrolysis problem polyvinylchloride (PVC) and acrylic coatings have been applied to the polyester fibers. However, these coatings can become marred or scratched, particularly when used in rough terrains, thereby exposing the underlying polyester fibers to the adverse effects of hydrolysis. It is believed that this potential hydrolysis problem, even in connection with coated polyester fibers, has been responsible for the lack of widespread acceptance of reinforcing grid structures made from polyester fibers, especially where contact fluids may be aggressive, such as in landfills.

The use of a polyolefin to form a reinforcing grid structure initially may be more expensive than the use of polyester filaments, because the lower creep reduction factor of polyolefins dictates the use of more material to form reinforcing grid structures in a given stabilization project. However, since polyolefins are not subject to hydrolysis, their useful life generally will be longer than polyester fibers. Moreover, there is a perception in the industry that the strength achievable at junctions in extruded polyolefin plastic netting is better than the strength achievable at the junctions employing woven and non-woven polyester fibers. It is for these latter reasons that the use of polyolefins to form reinforcing grids has been better accepted than the use of polyester fibers.

Although presently available plastic reinforcing net structures have proven generally satisfactory for their intended purpose, improved processes and apparatus for forming such netting, as well as improved netting structures, are always desirable. It is to such improved processes, apparatus and structures that the present invention relates.

At the outset it is important to understand that the plastic reinforcing net structures in accordance with this invention are substantially different from the flexible plastic net structures which have been employed as facing sheets for sanitary products (e.g., sanitary napkins, disposable diapers incontinent pads, etc.), as pallet wraps and for other similar applications. Specifically, the plastic reinforcing net structures of this invention, which are employed in civil engineering, soil stabilization and landfill applications, are of a much heavier weight and are substantially less flexible than the aforementioned flexible net products. Because of this fact there are limitations on the use of conventional net forming systems, such as those employing counter-rotating die heads, to form the net structures of this invention. In particular, because of the lack of flexibility of the heavy strands required for use in making reinforcing grid structures of this invention, it is very difficult to form a flat reinforcing grid from a preformed cylindrical tube extruded through counter-rotating die heads. In particular, the preformed tube will have a memory for its tubular configuration. Thus, when the extruded tube is slit to form a planar sheet, the sheet will tend to curl back into a cylindrical configuration, thereby creating undesirable handling problems.

Another drawback in utilizing counter-rotating die heads in an extrusion device for extruding a reinforcing net from heavy strands, is that it is necessary for the extrusion slots in the heads to be quite deep and wide. This limits the number of slots that can be included in a given diameter extrusion plate, which in turn limits the number of strands which can be included in the formed net. Stating this another way, when a large number of strands are to be included in the finished netting, the use of excessively large die heads, as well as other large extrusion components, would be required.

In prior art, biaxially oriented, extruded polyolefin netting, a random molecular orientation exists in web areas located at the periphery of the junctions of the machine-direction and cross-machine-direction strands. These web areas are regions of undesirably low strength. Moreover, central regions of the junctions tend to be in the form of thick, unoriented humps. These humps, in addition to constituting undesired areas of weakness, also constitute areas in which material is being inefficiently used. It is a general belief in the industry that the junctions of the machine-direction and cross-machine-direction filaments in the reinforcing net must be strong, since these junctions do bear a considerable amount of the load when the netting is being used for its intended function.

The prior art shows various arrangements for forming plastic netting. For example, U.S. Pat. No. 3,477,892, issued to Plymale, discloses, in FIG. 3 thereof, an arrangement wherein a fixed extruder 61 extrudes a circular, spaced-apart array of continuous filaments, and a second extruder 22, through the mounting of wheels 51 in tracks 52, rotates in a circular path around the filaments extruded through the fixed extruder 61, to form a tubular net product.

U.S. Pat. No. 3,085,292, issued to Kindseth, discloses a method of forming plastic netting by extruding a plastic material directly into a net configuration defined between contacting smooth surface roll 14 and grooved roll 13. The roll 13 includes circumferentially directed, axially spaced-apart grooves 16, and axially directed, circumferentially spaced-apart grooves 17. The plastic material extruded between the roller 13 and 14 fills only the grooves 16 and 17, to thereby form a plastic netting.

U.S. Pat. No. 3,394,431, issued to Nalle, Jr., discloses an arrangement for extruding plastic material into axially directed grooves 26 and circumferentially directed grooves 24, to thereby form a plastic net product. This arrangement is illustrated in FIGS. 1 through 3. In an alternate embodiment illustrated in FIGS. 4 through 6, extruded plastic material is directed into axially-extending, circumferentially spaced-apart grooves 50 provided in a roller mechanism 40, and longitudinally directed, axially spaced-apart plastic strands are extruded through spaced-apart grooves 32 formed in the edge portion of plate member 46, to thereby form a plastic net product.

Other patents which generally relate to plastic netting are U.S. Pat. Nos. 3,015,854 (McClure); 3,505,157 (Fields, et al); 3,515,778 (Gills, et al.) and 4,631,161 (Popow).

OBJECTS OF THE INVENTION

It is a general object of this invention to provide an oriented, biplanar plastic reinforcing net utilizable in civil engineering and/or landfill applications.

It is a more specific object of this invention to provide an oriented, biplanar net structure having high strength, even in bonded junctions thereof.

It is a further object of this invention to provide a method of making an oriented, biplanar net structure usable to provide reinforcement in civil engineering and/or landfill applications, which is easy to carry out and versatile in operation.

It is a more specific object of this invention to provide a method of making an oriented, biplanar net structure of a heavier weight than can be formed by utilizing prior art counter-rotating extrusion die systems.

It is a further object of this invention to provide a process for making an oriented, biplanar net structure which permits more reliable control over the temperature conditions employed during stretch orientation, either uniaxially or biaxially, than in prior art processes.

It is a further object of this invention to provide a process of forming an oriented, biplanar net structure wherein the configuration of the filaments employed to form the net structure can be easily and reliably controlled.

It is a further object of this invention to provide an apparatus for making an oriented, biplanar net structure usable to provide reinforcement in civil engineering and/or landfill applications, which is reliable and versatile in operation.

It is a further object of this invention to provide an apparatus for making an oriented, biplanar net structure usable to provide reinforcement in civil engineering and/or landfill applications, wherein the shape and configuration of the filament strands making up the plastic netting can be easily and reliable controlled.

It is a further object of this invention to provide an apparatus for making an oriented, biplanar net structure usable to provide reinforcement in civil engineering and/or landfill applications, wherein temperature conditions of the net permit effective orientation of the net, either uniaxially or biaxially, can be easily and reliably controlled.

SUMMARY

The above and other objects of this invention are achieved by a method and apparatus for making a biplanar plastic net structure in which first and second linear arrays of filaments of the net are extruded into first and second sets of space-apart grooves, respectively, provided in a filament receiving member. The first set of spaced-apart grooves is aligned in a first direction, and the second set of grooves is shallower than the first set of grooves and is aligned in a second direction intersecting the first set of grooves. The first and second sets of grooves communicate with each other at their points of intersection, such that the first and second linear arrays of filaments extruded into the first and second sets of grooves contact and bond to each other at their points of intersection, to thereby form a plastic net. In the initially formed plastic net the filaments of the first linear array have central axes lying in a plane which is different from the plane of the central axes of the filaments of the second linear array. After the net is formed it is molecularly oriented in at least one linear direction by stretching said net.

In the preferred method and apparatus of this invention, prior to stretching the net to molecularly orient the filaments therein, the temperature of the net is reduced so that at least a portion of the filaments to be molecularly oriented is in the temperature range in which molecular orientation will take place upon stretching of the net.

In a preferred method and apparatus of this invention the first linear array of filaments is directed into the first set of spaced-apart grooves by moving a first extruder relative to the filament receiving member, and the second linear array of filaments is directed into the second set of spaced-apart grooves by moving a second extruder relative to the filament receiving member.

In accordance with a preferred method and apparatus of this invention the filament receiving member is maintained in a stationary condition when the second extruder is being moved to deposit the second linear array of plastic filaments into the second set of spaced-apart grooves, into overlying relationship with a first linear array of plastic filaments previously directed into the first set of spaced-apart grooves, and located in underlying relationship with the second set of spaced-apart grooves.

A biplanar net structure usable to provide reinforcement in civil engineering and/or landfill applications, in accordance with this invention, includes a first linear array of spaced-apart plastic filaments, a second linear array of spaced-apart plastic filaments crossing the first linear array and being bonded to said first linear array at junctions located at the points of crossing to provide a biplanar net structure. The axes of the first linear array of filaments are located in a plane which is different from the plane occupied by the axes of the second linear array of filaments, and at least the filaments in one of the first and second linear arrays are molecularly oriented by stretching, said molecular orientation existing along the entire length of the filaments, including the junctions. The net structures of this invention, prior to stretching, have a weight in the range of 500 to 2,500 pounds per 1,000 square feet; more preferably in the range of 1,000 to 2,000 pounds per 1,000 square feet, and most preferably in the range of 1,000 to 1,500 pounds per 1,000 square feet. In the preferred embodiment of this invention the filaments are extruded from a polyolefin; and most preferably from polyethylene or polyproplylene.

In the preferred embodiment of this invention the net structure, after formation, is either uniaxially or biaxially stretched in the range of 3:1–10:1.

BRIEF DESCRIPTION OF THE DRAWINGS

Other objects and many of the attendant advantages of this invention will be readily appreciated as the same becomes better understood by reference to the following detailed description when considered in connection with the accompanying drawings, wherein.

DESCRIPTION OF THE PREFERRED EMBODIMENT OF THE INVENTION

Figure 1:
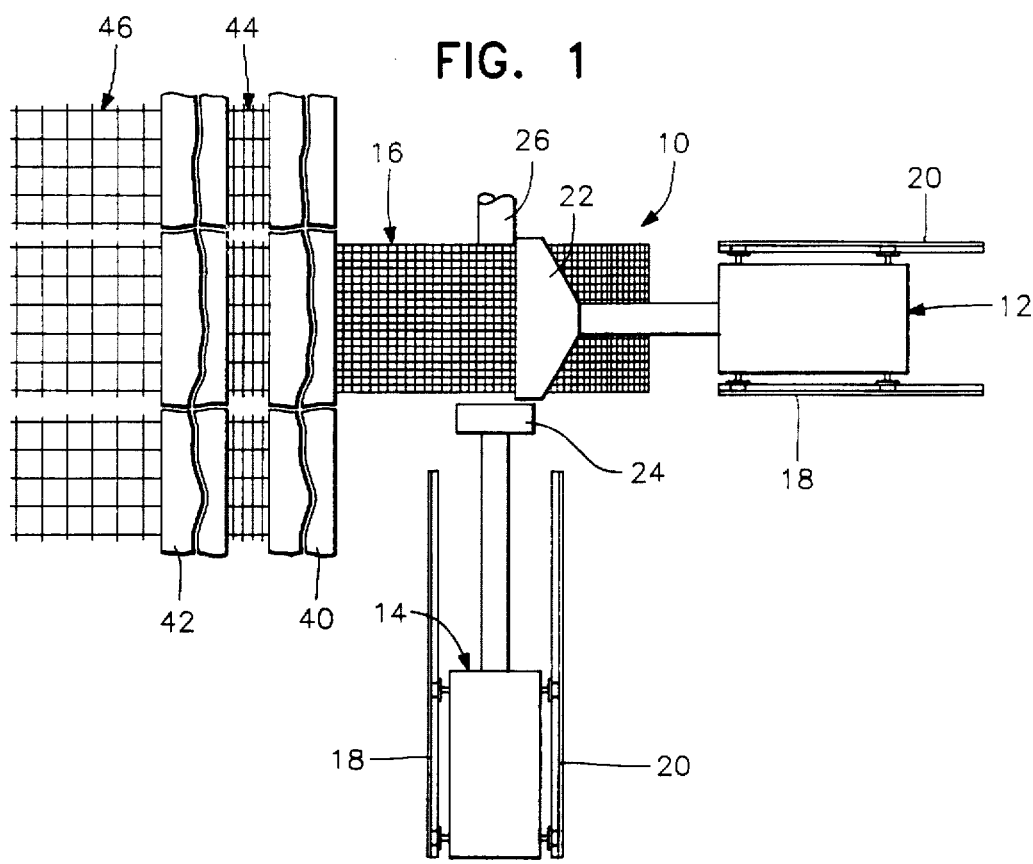
FIGS. 1 through 4 illustrate the sequential positions and manner of movement of the extrusion die heads in accordance with the apparatus and method of this invention.

Referring now in greater detail to the various figures of the drawings wherein like reference characters refer to like parts, an extrusion apparatus embodying the present invention is generally shown at 10 in FIGS. 1 through 4. The apparatus 10 basically comprises a pair of linearly movable extruders 12, 14; a movable filament receiving member 16 for receiving filaments from the extruders 12 and 14 to form a plastic net structure thereon, and conventional stretching units for either uniaxially or biaxially stretching the net structures formed on the receiving member 16, to form the oriented nets in accordance with this invention.

Referring specifically to FIG. 1, each of the extruders 12 and 14 schematically illustrated therein is mounted for linear, reciprocating movement on laterally spaced-apart tracks 18 and 20, respectively. The extruders 12 and 14 employed in this invention can be of any conventional design, and include die heads 22 and 24, respectively, through which planar arrays of spaced-apart filaments 23 and 25 are extruded (see FIGS. 6 and 7). The array of filaments 23 directed through the die head 22 of extruder 12 is deposited onto the filament receiving member 16, in a manner which will be discussed in greater detail hereinafter. The array of filaments 25 directed through the die head 24 of extruder 14 is deposited on the filament receiving member 16, in overlying and contacting relationship with the array of filaments 23, in a manner which also will be discussed in greater detail hereinafter.

Figure 5:
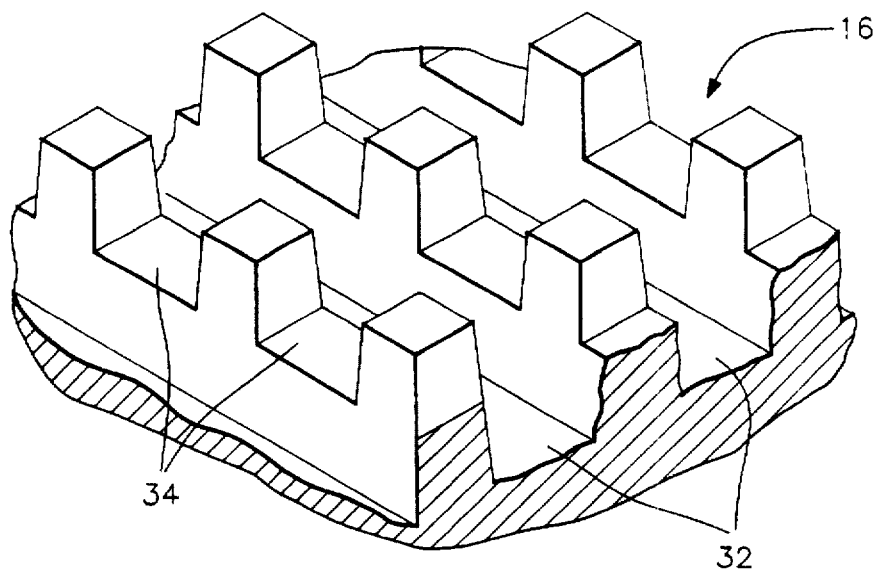
FIG. 5 is a fragmentary isometric view showing a portion of the filament receiving member onto which filaments extruded through the die heads are directed.
Figure 6:
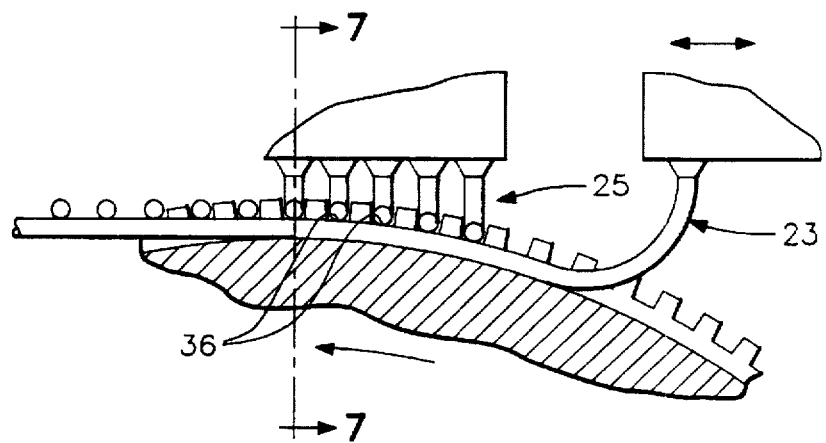
FIG. 6 is a sectional view through the filament receiving member, looking in the cross-machine-direction of the apparatus, and illustrating the manner in which extruded filaments are directed into overlying relationship to form a biplanar net in accordance with this invention.
Figure 7:
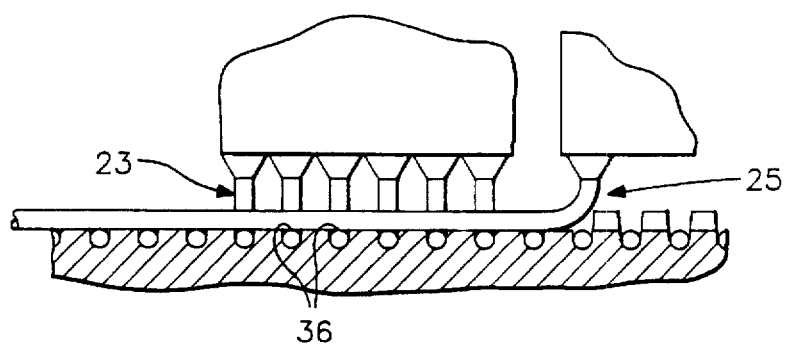
FIG. 7 is a sectional view taken along line 7—7 of FIG. 6.

Referring specifically to FIGS. 5 through 7, a preferred filament receiving member 16 is illustrated. As can be seen best in FIGS. 1 and 2, the filament receiving member is in the form of a roll 16 which is rotatably mounted about a central axle 26. However, it should be understood that in accordance with the broadest aspects of this invention the filament receiving member may be in the form of a movable belt or other member into which grooves are provided, as will now be described in connection with the roll 16.

Referring specifically to FIG. 5, the roll 16 includes a plurality of radially spaced-apart, circumferentially extending grooves 32 for receiving the array of spaced-apart filaments 23 directed through the die head 22, and a plurality of circumferentially spaced-apart, radially extending grooves 34 for receiving the array of filaments 25 extruded through the die head 24. As can be seen clearly in FIG. 5, the spaced-apart grooves 32 are deeper than the spaced-apart grooves 34. However, as can be seen best in FIGS. 6 and 7, the depths of the respective grooves 32 and 34 are selected such that the array of machine-direction filaments 23 and cross-machine-direction filaments 25 will actually contact and engage each other at their crossing points or junctions 36. In this manner, a biplanar net structure is formed on the filament receiving roll 16, with the filaments being bonded at their contacting junctions 36, as will be discussed in greater detail hereinafter.

Referring to FIGS. 1 through 4, the apparatus 10 is provided with conventional cross-machine-direction and/or machine-direction stretching units 40 and 42, respectively, depending upon whether the net to be formed is to be uniaxially or biaxially stretched. It should be understood that the specific units 40 and 42 employed to stretch the net can be of conventional, known designs, and do not form a part of the present invention. It is for this reason that the units are illustrated schematically in the drawings.

As is shown schematically at 40 in FIGS. 1 through 4, a cross-machine-direction stretching unit is employed immediately adjacent the filament receiving roll 16, to stretch the net in the cross-machine-direction. In a preferred form of the invention the stretching unit is a conventional tenter unit. The length of the unit will be dictated, in part, by the degree of cross-machine-direction stretch which is to be imparted to the net. Such a conventional tenter unit is sold by Marshall and Williams in Rhode Island, and includes opposed, transversely spaced-apart chain-driven rows of clamping jaws which are designed to automatically clamp the longitudinally extending edges of the net as it leaves the roll 16. These jaws, as they are being moved in the machine-direction, are directed transversely away from each other in the cross-machine-direction to transversely stretch the net into a form schematically illustrated at 44 (FIGS. 1–4).

A conventional machine-direction stretcher unit 42 can include a plurality of rolls arranged to receive the net from the tenter unit 40, in a serpentine fashion. By controlling the speed of the rolls, the net can be stretched to a desired degree in the machine-direction to form, in conjunction with the tenter unit 40, a biaxially oriented net in accordance with the present invention, as is schematically illustrated at 46 (FIGS. 1–4).

A representative cross-machine-direction stretching unit 40 and machine-direction stretching unit 42 are shown and described in pending U.S. patent application Ser. No. 5,207,962, entitled "Method of Making Apertured Film Fabrics", the subject matter of which is herein incorporated by reference.

Referring specifically to FIGS. 1 through 4, the sequential steps in forming the net on the filament receiving roll 16 will now be described.

FIG. 1 shows the position of the die heads 22 and 24 at a point in time when the grooved forming roll 16 has just reached a stationary condition, and an array of filaments 23 has been deposited in grooves 32, in a region below the grooves 34 that are aligned with the die head 24. At this point in the operation the die head 24 of extruder 14 is located adjacent one transverse edge of the roller 16, and the die head 22 is located in its most downstream position, overlying the filament receiving roll 16.

Figure 2:
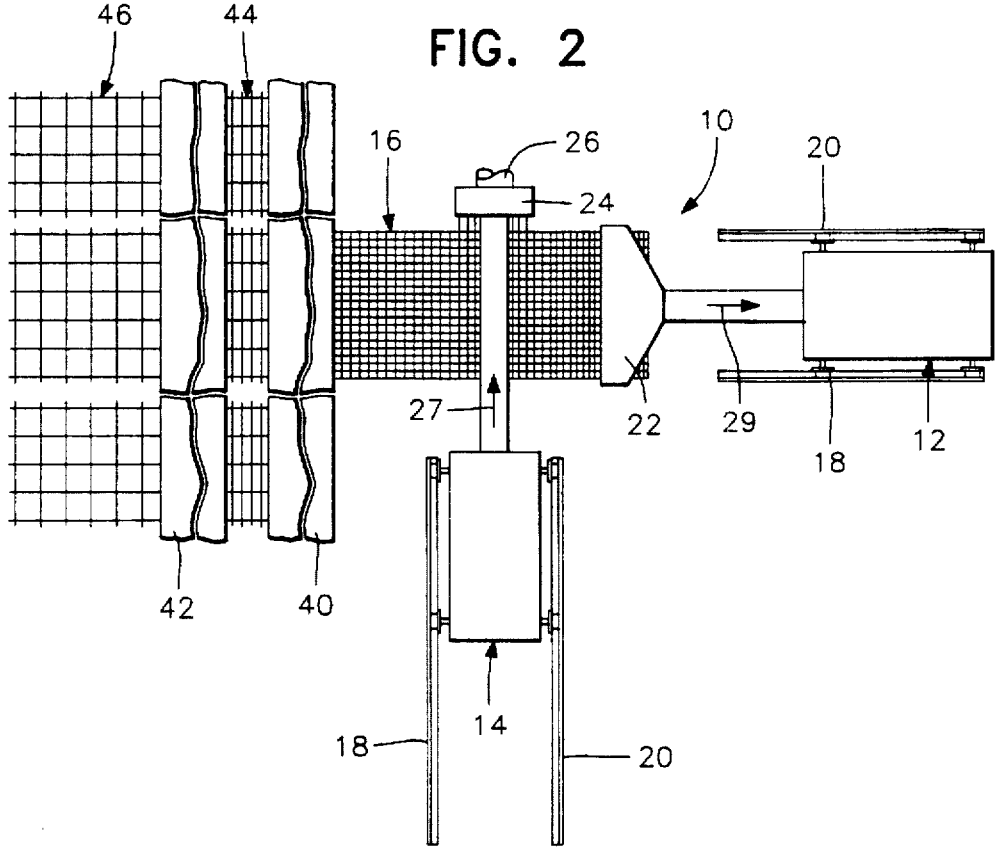

Referring to FIG. 2, after the filament receiving roll 16 has reached a stationary condition, the extruder 14 is caused to move in a radial direction, as is illustrated by arrow 27, to cause the die head 24 thereof to traverse the roll 16 and deposit an array of filaments 25 into underlying, aligned grooves 34 (e.g., FIG. 6). At the same time the extruder 12 is moved in a linear upstream direction, as is illustrated by arrow 29, to cause the die head 22 to move in this same upstream direction. As the die head is being moved in the direction of arrow 29 an array of filaments 23 extruded therefrom is deposited into underlying aligned grooves 32 of the stationary roll 16 (e.g., FIG. 6).

Thus, FIGS. 1 and 2 show the arrangement and manner of moving the extruders 12 and 14 during a period of time that the roll 16 is in a stationary or "dwell" condition.

Figure 3:
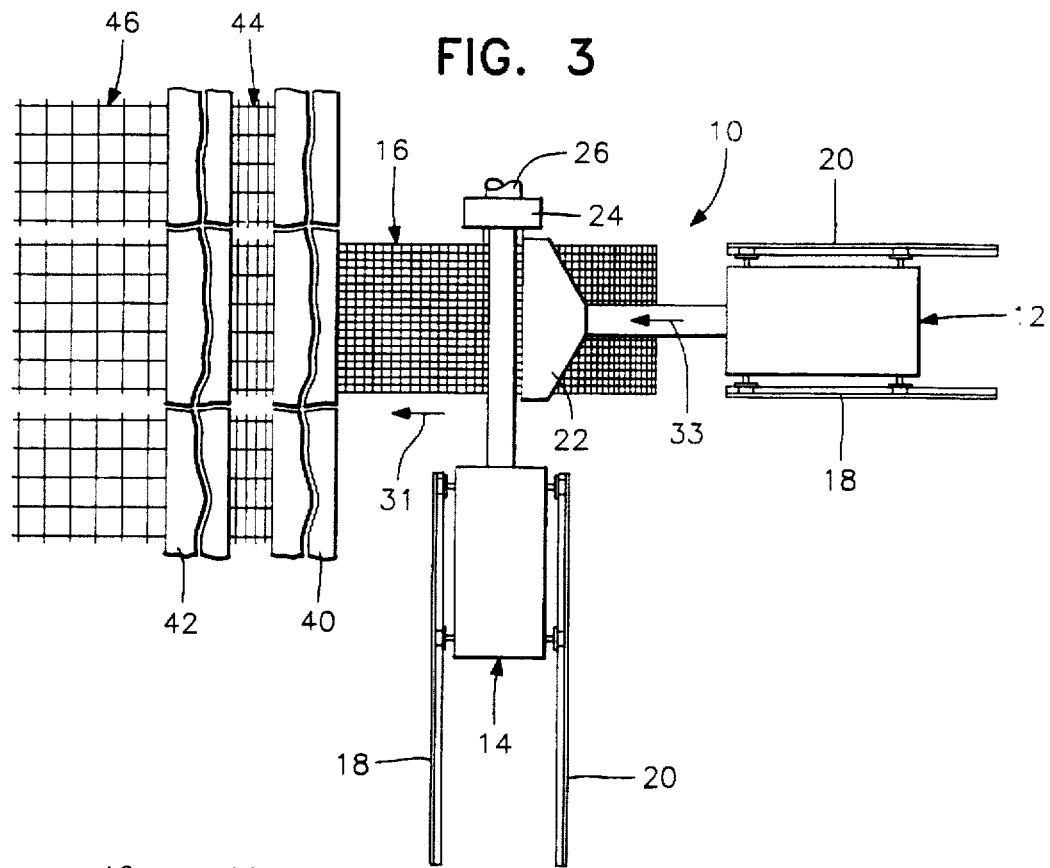

Referring to FIG. 3, after the extruder 12 has moved to its most upstream position, in the direction of arrow 29, and the extruder 14 has moved to its position closest to roller 16, in the direction of arrow 27, the roll 16 is caused to rotate, as is schematically illustrated by arrow 31. At this same time the extruder 12 is caused to move in a downstream direction, as is illustrated by arrow 33, while the extruder 24 is maintained in a stationary condition. It should be understood that the linear movement of extruder 12 and of the roll 16 are synchronized so that the extruder and grooved surface of the roll move at essentially the same speed, so that continuous filaments 23 are continuously deposited in the spaced-apart grooves 32 as both the extruder 12 and roll 16 are being moved.

Figure 4:
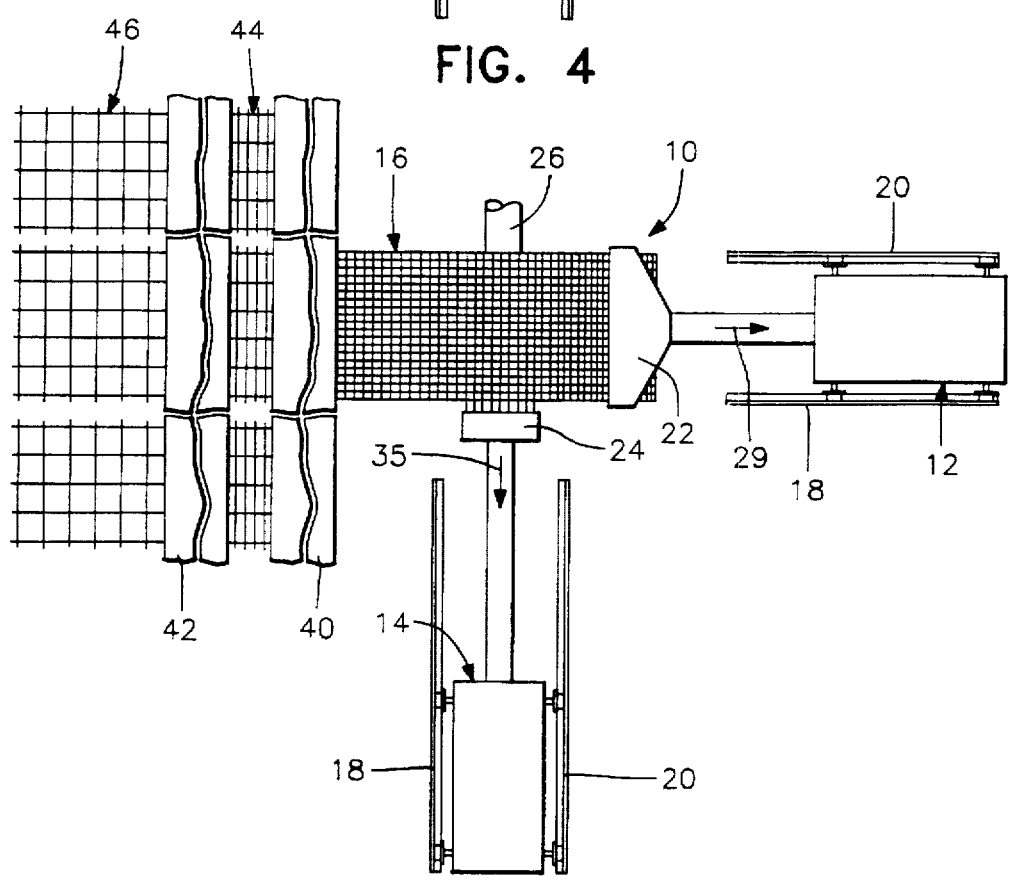

Referring to FIG. 4, after extruder 12 has moved in the direction of arrow 33 to its most downstream position, movement of the roll 16 is discontinued, the extruder 12 again is moved linearly in an upstream direction, in the direction of arrow 29, and simultaneously, the extruder 14 is moved linearly in the direction of arrow 35. This latter movement of extruder 14 causes the die head 24 to traverse the stationary roll 16 in a radial direction, and thereby deposit an array of cross-machine-direction filaments 25 into grooves 34, in overlying relationship with a previously deposited array of machine-direction filaments 23. Likewise, an array of filaments 23 is continuously deposited into the circumferential grooves 32 of roll 16, as the extruder 12 is being moved in the direction of arrow 29.

After the extruders 12 and 14 have moved into the positions illustrated in FIG. 4, the extruder 12 is caused to move linearly in the direction of arrow 33, synchronously with the rotational movement of roll 16, until the extruder 12 again reaches the position illustrated in FIG. 1, at which time rotation of the roll 16 is discontinued.

It should be understood that the cross-machine-direction stretching of the net through tenter unit 40 and/or the machine-direction stretching of the net through unit 42 preferably is carried out intermittently, only during the portions of the net forming operation in which the filament receiving roll 16 is being rotated, as described earlier herein.

In accordance with the process and apparatus of the present invention biplanar plastic reinforcing netting is formed of heavy, highly oriented strands of a plastic material; preferably a polyolefin. These materials are either uniaxially or biaxially stretched so that they will be in the high modulus, low creep region, which is the region required for plastic netting which is to be used for the reinforcing applications contemplated by this invention.

In accordance with the present invention the machine and cross-machine-direction strands or filaments of the biplanar net have a high aspect ratio (e.g., they tend to be generally round). This is in distinction to the generally flat filaments employed in the polyolefin nets manufactured by Tensar. The use of round strands, as opposed to generally flat strands, can increase the breaking load of the net structures employing such strands by as much as 20% to 30%. Stating this another way, the mass to surface area ratio of the filaments is important in establishing breaking load, and for an equivalent mass, round strands have a higher breaking load than flat strands.

In accordance with this invention the machine-direction grooves 32, into which the array of filaments 23 is extruded, have a depth in the range of ⅛ inch to ¾ inch, and a width in the range of ⅛ inch to ½ inch. Preferably the machine-direction grooves 32 are intersected by cross-machine-direction grooves 34 having a depth of ¼ inch to ¹⁄₁₆ inch, and a width in the range of ⅛ inch to 3 inch. More preferably the width of the cross-machine-direction grooves 34 is in the range of ⅛" to ½", and most preferably in the range of ⅛" to ½".

It should be appreciated that the relationship between the depth of the machine-direction and cross-machine-direction grooves 32 and 34, respectively, determines the biplanarity of the web, and in part, the degree of bonding between the machine-direction and cross-machine-direction filaments extruded into these grooves. In addition, the chemistry of the polymer and the temperature of the filaments as they are laid on top of each other will control the degree of bonding.

In a preferred embodiment of this invention the machine-direction strands are extruded as a substantially planar sheet or array having a width in the range of 3 to 6 feet, and the array of filaments 23 are received in the machine-direction grooves 32 in a very closely spaced relationship to each other. When it is desired to form a biaxially oriented plastic net with a spacing between strands of 1 inch, and assuming a stretch ratio of 5:1, then the spacing between the filaments of the initial extrusion (i.e., as deposited on roll 16, prior to stretching) will be only 0.2 inches. With a filament diameter of ³⁄₁₆ inch and a width of 14 feet in the completed, oriented net, approximately 141 machine-direction strands will be included over the 168 inches (14 feet) of width of the oriented net to establish the 1 inch spacing (edge to edge) between filaments. A 2½ inch spacing between strands, each of which has an initial diameter of ⁷⁄₁₆ inch, can be established by stretching a 6 foot wide extrusion having 141 strands in the widthwise direction (i.e., cross-machine-direction) at a 5:1 ratio, to thereby increase the width to 30 feet.

In accordance with this invention the formed web is either biaxially or uniaxially oriented at a ratio of 3:1–10:1; more preferably in the ratio of 3½:1–7:1; and most preferably in the ratio of 3½:1–5½:1.

Because the initial extrusion is formed as a biplanar net on the roll 16, it is possible to stretch both the machine-direction and cross-machine-direction filaments of the net through the joints, to some extent, since the joints do not cross each other in a single plane to "block" stretching at the juctions. This permits for higher orientation (e.g., in the range of 7:1 to 8:1) relative to uniplanar nets, thereby permitting a more effective utilization of material and lower creep rates than in uniplanar nets.

In accordance with the preferred embodiment of this invention both the machine-direction grooves 32 and the cross-machine-direction grooves 34 can be spaced as close as ⅛ inch from adjacent grooves. It is important that the extruded plastic material be completely confined within the grooves, in order to prevent the adjacent strands, while they are still in a relatively low viscosity state, from bonding to each other, and thereby closing off the apertures in the initially formed net, and consequently in the final, oriented net.

As stated earlier, the bond strength at the junction of the machine-direction and cross-machine-direction strands in the oriented net (i.e., either uniaxially or biaxially stretched) is determined by the relative biplanarity of the initially formed web, the temperature of the filaments at the time they are joined, the surface area of contact and the chemistry of the materials. Thus, the bond strength is determined by the above conditions, prior to stretching. Although there will be a mix of orientations at the junctions of the overlapping portions of the machine-direction and cross-machine-direction filaments, the portions of these filaments which are not in a common plane will tend to be highly oriented in their respective directions of stretch.

One limiting factor on the size of the filaments which can be employed in forming oriented net structures has always been the ability to reheat the initially formed net (after it has been cooled to set the plastic) to a temperature at which the plastic can be stretch-oriented.

In accordance with prior art teachings, the initially formed netting, prior to stretching, generally is cooled to a temperature below its desired stretch temperature, in order to stabilize the extrudate. When the netting initially is extruded in the form of a cylindrical tube, the tube first is cooled to stabilize it, then is cut into a substantially flat sheet and thereafter is reheated prior to the stretching operation.

One of the important features of this invention is that the heat of the extrudate is maintained so that the centers of the filaments are not lowered to a temperature below the temperature range in which stretch orientation can be achieved. The reason this is possible is that the individually, extruded filaments are well supported in a generally horizontal plane within the grooves 32 and 34, to thereby maintain the desired configuration of the filaments without the need to cool the extrudate to a stabilization temperature below the temperature range at which stretch orientation can take place. In other words, in accordance with the present process, there is no need to be concerned about the melt strength of the product, since the product is supported in the grooves 32 and 34.

In accordance with an exemplary process of this invention the extrudate is formed of polypropylene having a melt temperature in the range of approximately 260° F. to 270° F., and an orientation temperature in the range of approximately 150° F. to approximately 200° F., and most preferably in the range of 175° F. to 200° F. The initially extruded filaments are directed onto the roll 16 within the melt temperature range. The residence time of the filaments on the roll, and the use of water spray treatment or cooling air, if needed, brings the temperature of the extrudate into the stretch range, at which time either uniaxially or biaxially stretching of the net is accomplished.

When the extruded net is stretched in a cross-machine-direction, the regions experiencing the greatest stretch will be the thinnest regions, which are the regions between the junctions of crossing machine-direction and cross-machine-direction filaments. Moreover, the cross-machine-direction filaments also will stretch in the region generally overlying the machine-direction strands, in view of the fact that the biplanarity of the web does not provide a blocking action to the continuous stretching along the cross-machine-direction filaments. This permits a higher degree of cross-machine-direction stretch than is achievable in uniplanar structures. Most preferably the netting in this invention is stretched in the range of 5:1 to 8:1.

It should be understood that increasing the overall dimensions of the web by either uniaxially or biaxially stretching the web does not increase the break load of the finished product. However, the greater the degree of stretch, the greater the surface area that can be covered by the reinforcing net, for a given mass of starting material. Thus, the ability to achieve a higher stretch provides for a more cost effective product.

In summary, the present invention has numerous advantages over the prior art.

In accordance with this process the extruded netting does not need to be cooled to stabilize it, and the original heat of extrusion is retained to thereby eliminate the need to reheat the net preparatory to uniaxial or biaxial stretching. This permits the formation of netting from thicker filaments than can be employed in the forming of netting which initially is cooled below the stretch temperature, and then requires subsequent heating to bring the filaments into the desired temperature range for stretching. Moreover, the process of this invention is more efficient since it eliminates the steps of cooling and reheating, as in prior art methods.

An additional advantage of this invention is that the size of the filaments is not limited by the need to reheat the filaments into the stretch temperature range following any cooling operation. That is, in the present invention there is no need to reheat the strands from a cool condition back to a temperature for stretching, a procedure which cannot be efficiently achieved when large diameter filaments are employed.

Another advantage of this invention is that there are no speed limitations in forming the net which are dictated by the need to reheat the filaments of the netting into a temperature range for stretching, as in prior art systems in which the netting initially is cooled to a stabilization temperature below the stretch temperature range. In the present invention the heat of the extrudate is maintained while the extrudate is supported within the grooves 32 and 34 of the roller 16, and the temperature of the netting is controlled by bringing it down into a range in which stretching can take place. This process, while bringing the temperature of the extrudate down into the stretch temperature range, has the further advantage of achieving some orientation even if parts of the filaments are too hot to become oriented.

However, if the extrudate initially is cooled below its stretch temperature to set the extrudate, and stretching is attempted prior to all of the filaments being completely heated into the stretch temperature range, the filaments can break during the stretching operation. Thus, a greater window (i.e., temperature range) for uniaxially and/or biaxially orienting the net is provided by the process of this invention, than in processes wherein the temperature of the plastic netting initially is cooled below the stretch temperature range, and then needs to be reheated back into that range.

A further advantage is that the shape of the strands can be controlled, due to the fact that both the machine-direction and cross-machine-direction strands are retained in grooves as the filaments are initially formed. Thus, in the finished product the strands approach a more round configuration than in prior art constructions. By forming generally rounded strands in both the machine-direction and cross-machine-direction of the formed net, the breaking load of the net can be improved by as much as 20% to 30%, as compared to generally flat, oriented strands.

An additional advantage of this invention is the ability to control the biplanarity of the formed net. Forming the net as a biplanar construction, as opposed to a uniplanar construction, has a number of advantages, including the ability to achieve higher orientation ratios, higher pull out strength, and higher fluid transmissivity (e.g., when uniaxially oriented net is employed as both a drainage net and for veneer reinforcement in landfills).

In addition, the present invention permits the use of low cost dies having no moving parts. Thus, equipment costs are minimized. An additional advantage is that the size of the formed nets can be varied merely by removing end caps from the dies 22 and 24 to easily increase their length. This cannot be accomplished in systems employing counter-rotating circular dies.

Moreover, since separate extruders are employed to form the machine-direction and cross-machine-direction filaments, it is possible to form these filaments of different, but compatible materials. For example, it is possible to form either the machine-direction or the cross-machine-direction filaments of an ethylene-propylene copolymer, and to form the other set of filaments of a polyethylene homopolymer, if desired. Of course, the particular materials employed in the filaments will be dictated by the use and properties desired in the netting.

A further advantage of this invention is that the extruded net can be oriented through the junction, thereby permitting greater stretch ratios to be achieved than in prior art uniplanar constructions. This improves the economics of net formation.

A further advantage, of this invention is that the biplanar construction provides for high transmissivity of fluids, and the ability to stretch both the machine-direction and cross-machine-direction filaments through the junctions provides for a higher modulus, lower creep construction.

An additional advantage of the present invention is that there is no scrap formed, as is the case in prior art processes in which sections of a substantially thick sheet of plastic material initially are stamped out of the sheet to provide apertures, prior to uniaxial and/or biaxial stretching.

In accordance with prior art techniques biaxially oriented products most commonly are made from polypropylene, wherein high density polyethylene generally has been used for uniaxially oriented net structures. The reason for this is that highly crystalline structures, such as high density polyethylene, tend to be more difficult to orient due to their relatively narrow orientation temperature window. To orient polyethylene, one must stretch the polyethylene prior to its crystallization structure being formed, i.e., prior to cooling the extrudate down into the crystallization temperature range. In the present invention the formed extrudate is never taken down into the crystallization temperature prior to uniaxial and/or biaxial orientation, and therefore oriented polyethylene nets can be more easily and reliably formed in accordance with this invention, then in prior art processes requiring cooling of the extruded net to a net stabilization temperature, which may result in crystallization occurring prior to the stretch-orientation operation, thereby creating manufacturing inefficiencies.

In prior art rotary die systems for forming tubular extrusions of filaments, the width to depth ratio of the grooves in each of the circular plates is generally in the range of about 3:1, to thereby provide a shallow angle to prevent wearing of the grooves at the corners thereof, due to the high speed, counter-rotation of the plates relative to each other. In accordance with the present invention the width to depth ratio of the grooves through which filaments are extruded is less than 2:1; and preferably not wider than the depth; and most preferably narrower than the depth. In other words, in the most preferred form of this invention the ratio of width to depth of the grooves will be less than 1.

In accordance with this invention the net initially formed on roller 16 will have a weight in the range of 500 to 2,500 pounds per 1,000 square feet of material; more preferably in the range of 1000 to 2000 pounds per square feet; and most preferably in the range of 1,000 to 1,500 pounds per square feet. The weight of extruded nets formed in accordance with this invention is substantially higher than can be achieved with the use of counter-rotating dies. In particular, the filaments formed through counter-rotating dies generally have a weight of less than 200 pounds per 1,000 square feet, and most preferably a maximum weight of 160 pounds per 1,000 square feet. Thus, a prior art net of this latter weight, and biaxially stretched at a ratio of 4:1, will have a finished net weight of 10 pounds per 1,000 square feet. If the initial prior art extrudate is only uniaxially oriented at a ratio of 4:1, then the weight of the finished net will be approximately 40 pounds per 1,000 square feet.

In distinction to the prior art nets, in a preferred form of this invention the initial extruded net will have a weight of approximately 1,420 pounds per 1,000 square feet. If this net is biaxially oriented at a ratio of 5:1, then the finally formed net will have a weight of 56 pounds per 1,000 square feet (as distinguished from a maximum weight of 10–15 pounds per 1,000 square feet in biaxially oriented netting formed from counter-rotating dies, for example).

In accordance with the preferred embodiment of this invention the extruded net is formed at a weight in the range of 500 to 2,500 pounds per 1,000 square feet, and is thereafter biaxially oriented in the range of 3:1–10:1; more preferably in the range of 3:1–8:1; still more preferably in the range of 4:1–8:1; and most preferably in the range of 6:1–8:1. If the web is uniaxially oriented, it is oriented in the range of 4:1–11:1; more preferably in the range of 4:1–9:1; still more preferably in the range of 5:1–9:1; and most preferably in the range of 7:1–9:1.

Without further elaboration, the foregoing will so fully illustrate this invention that others may, by applying current or future knowledge, readily adapt the same for use under various conditions of service.

What I claim as my invention is the following:

1. A biplanar net structure usable to provide reinforcement in civil engineering and/or landfill applications, said net structure including:

a first linear array of spaced-apart plastic filaments;

a second linear array of spaced-apart plastic filaments crossing said first linear array of spaced-apart plastic filaments and being bonded to said first linear array at junctions located at the points of crossing to provide a biplanar net structure, the axes of the first linear array of filaments being located in a plane which is different from the plane occupied by the axes of the second linear array of filaments in the net structure;

at least the filaments in one of said first and second linear arrays being molecularly oriented by stretching, said molecular orientation extending along the entire length of the filaments, including the junctions;

said net structure, prior to stretching, having a weight in the range of 500–2,500 pounds per 1000 square feet.

2. The net structure of claim 1, having a weight, prior to stretching, in the range of 1000–2,000 pounds per 1000 square feet.

3. The net structure of claim 1, having a weight, prior to stretching, in the range of 1000–1,500 pounds per 1000 square feet.

4. The net structure of claim 1, being uniaxially stretched in the range of 3:1–10:1 after initial formation.

5. The net structure of claim 1, being uniaxially stretched in the range of 3½:1–7:1 after initial formation.

6. The net structure of claim 1, being uniaxially stretched in the range of 3½:1–5½:1 after initial formation.

7. The net structure of claim 1, being biaxially stretched in the range of 3:1–10:1 after initial formation.

8. The net structure of claim 1, being biaxially stretched in the range of 3½:1–7:1 after initial formation.

9. The net structure of claim 1, being biaxially stretched in the range of 3½:1–5½:1 after initial formation.

10. The net structure of claim 1, being stretched in the cross-machine-direction in the range of 5:1–8:1 after initial formation.

* * * * *